United States Patent [19]

Lin

[11] Patent Number: 6,132,041

[45] Date of Patent: Oct. 17, 2000

[54] EYEGLASSES WITH TWO SEPARATE SNAP FITTED LENSES

[75] Inventor: Jey-Ching Lin, Taipei, Taiwan

[73] Assignee: Mao Lin Enterprise Co., Ltd., Taipei, Taiwan

[21] Appl. No.: 09/400,548

[22] Filed: Sep. 21, 1999

[51] Int. Cl.[7] .................................................. G02C 1/04
[52] U.S. Cl. .......................... 351/105; 351/106; 351/154
[58] Field of Search .............................. 351/41, 103–106, 351/108, 109, 154

[56] References Cited

U.S. PATENT DOCUMENTS 5,900,922 5/1999 Moore ...................................... 351/103
5,903,331 5/1999 Lin ........................................... 351/105

*Primary Examiner*—Huy Mai
*Attorney, Agent, or Firm*—Fitzpatrick, Cella, Harper & Scinto

[57] ABSTRACT

A pair of eyeglasses includes a frame having two curved lens-engaging strips, each of which has an inner surface that is formed with an open-ended longitudinal slot. Each of the strips further has two ends that define a gap therebetween, and a downwardly flaring projection that protrudes integrally and downwardly therefrom and that is located in a corresponding one of the slots. Two lenses have upper edges that engage respectively the slots in the frame. Each of the upper edges has a constricted hole that engages fittingly a corresponding one of the projections of the frame. The lenses can be removed forcibly from the strips via the gaps.

3 Claims, 4 Drawing Sheets

EYEGLASSES WITH TWO SEPARATE SNAP FITTED LENSES

BACKGROUND OF THE INVENTION

1. Field of the Invention

This invention relates to a pair of eyeglasses, more particularly to a pair of eyeglasses, which has two separate lenses that are snap fitted respectively within two curved lens-engaging strips of a frame.

2. Description of the Related Art

Referring to FIGS. 1 and 2, a pair of eyeglasses disclosed by the applicant in U.S. Pat. No. 5,903,331 is show to include a frame unit 20, a unitary lens unit 30 and a unitary nose pad 40.

The frame unit 20 has a front frame 21, two temples 23 connected respectively to two ends of the front frame 21 by means of bolts 22, and a generally inverted Y-shaped nose support 24. The front frame 21 has two constricted slots 25 that are formed along a bottom surface thereof, and a downwardly flaring projection 26 protruding integrally and downwardly from a middle portion of the front frame 21 and located between the constricted slots 25. The projection 26 has two opposite sides that define two generally triangular inner end portions 251 of the constricted slots 25. Each of the constricted slots 25 has a curved outer end portion 252. The nose support 24 has four integral pins 241 and a generally planar front face 242.

The lens unit 30 has two aligned upwardly flaring upper portions 31 that define a constricted hole 32 therebetween and that are snap fitted respectively within the constricted slots 25 of the frame unit 20. The projection 26 of the frame unit 20 is snap fitted within the constricted hole 32 in the lens unit 30, thereby retaining the lens unit 30 on the frame unit 20. As illustrated, the lens unit 30 has two generally triangular projections 33 engaged within the generally triangular inner end portions 251 of the constricted slot 25 of the frame unit 20, and two curved projections 34 engaged within the curved outer end portions 252 of the constricted slot 25 in the frame unit 20. A rear surface of the lens unit 30 abuts against the front face 242 of the nose support 24 of the frame unit 20 for positioning the lens unit 30 relative to the frame unit 20.

The nose pad 40 is generally inverted U-shaped, and has a front surface formed with four pin holes 41 for insertion of the pins 241 of the nose support 24 in order to attach the nose pad 40 to the nose support 23.

Because the lens unit 30 is a single piece, which has a left half and a right half that form an angle therebetween, it is difficult to mount the same on the frame unit 20.

SUMMARY OF THE INVENTION

The object of this invention is to provide a pair of eyeglasses with two separate lenses that are snap fitted respectively within two curved lens-engaging strips of a frame.

According to this invention, a pair of eyeglasses includes a frame having two curved lens-engaging strips, each of which has an inner surface that is formed with an open-ended longitudinal slot. Each of the strips further has two ends that define a gap therebetween, and a downwardly flaring projection that protrudes integrally and downwardly therefrom and that is located in a corresponding one of the slots. Two lenses have upper edges that engage respectively the slots in the frame. Each of the upper edges has a constricted hole that engages fittingly a corresponding one of the projections of the frame. The lenses can be removed forcibly from the strips via the gaps.

Preferably, the frame includes a nose support that is formed integrally with the strips. Each of the strips has a generally straight inner end portion that is located near the nose support. Each of the lenses has a generally straight inner side that engages the generally straight inner end portion of a corresponding one of the strips. In assembly, when the lenses are inserted into the strips, the generally straight inner sides of the lenses slide respectively along the generally straight inner end portions of the strips, thereby engaging the projections within the constricted holes, respectively.

BRIEF DESCRIPTION OF THE DRAWINGS

Other features and advantages of the invention will become apparent in the following detailed description of a preferred embodiment, with reference to the accompanying drawings, in which.

DETAILED DESCRIPTION OF THE PREFERRED EMBODIMENT

Figure 1:
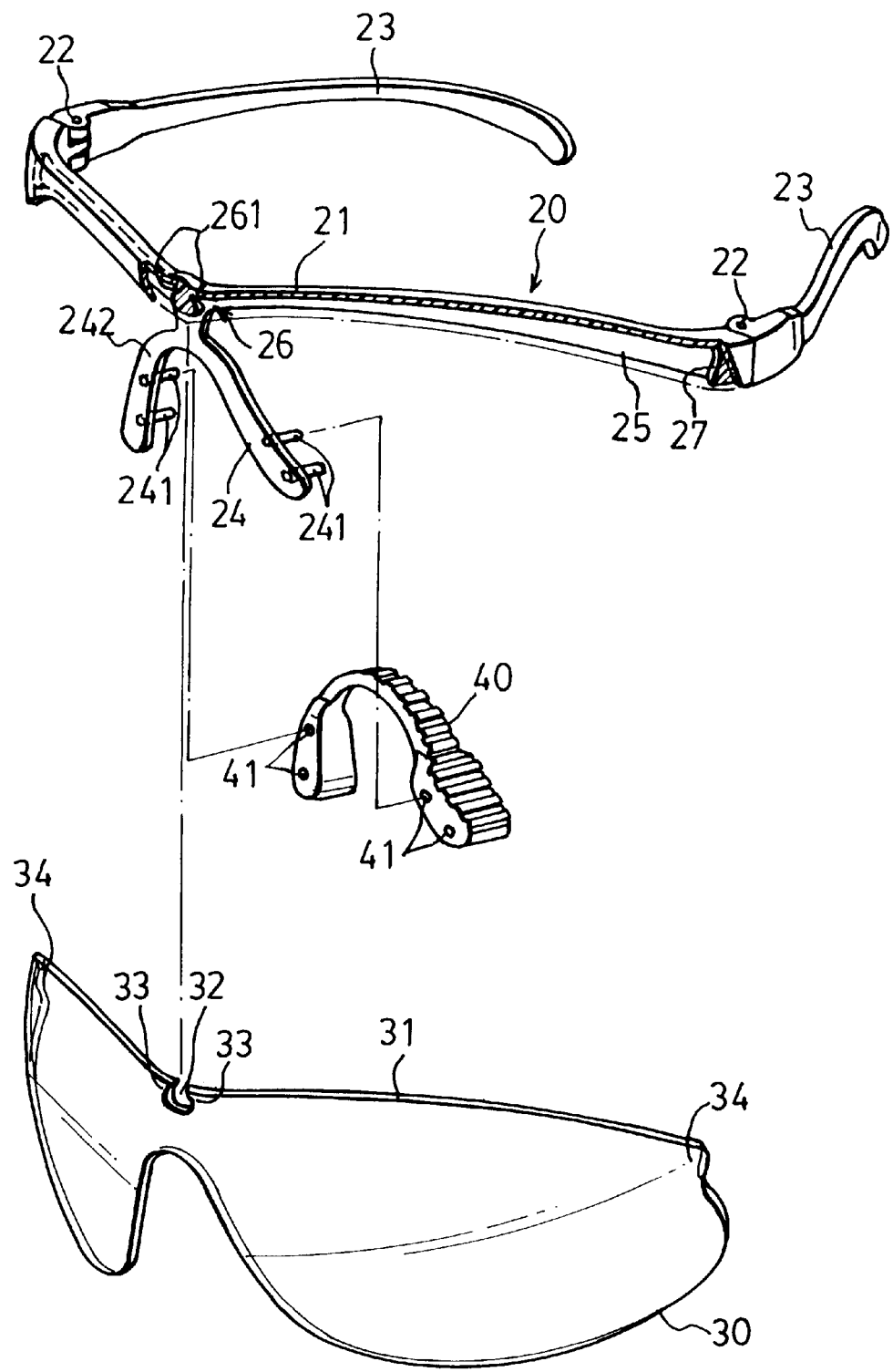
FIG. 1 is a partly exploded perspective view of a pair of conventional eyeglasses disclosed in U.S. Pat. No. 5,903, 331, which is issued to the applicant.
Figure 2:
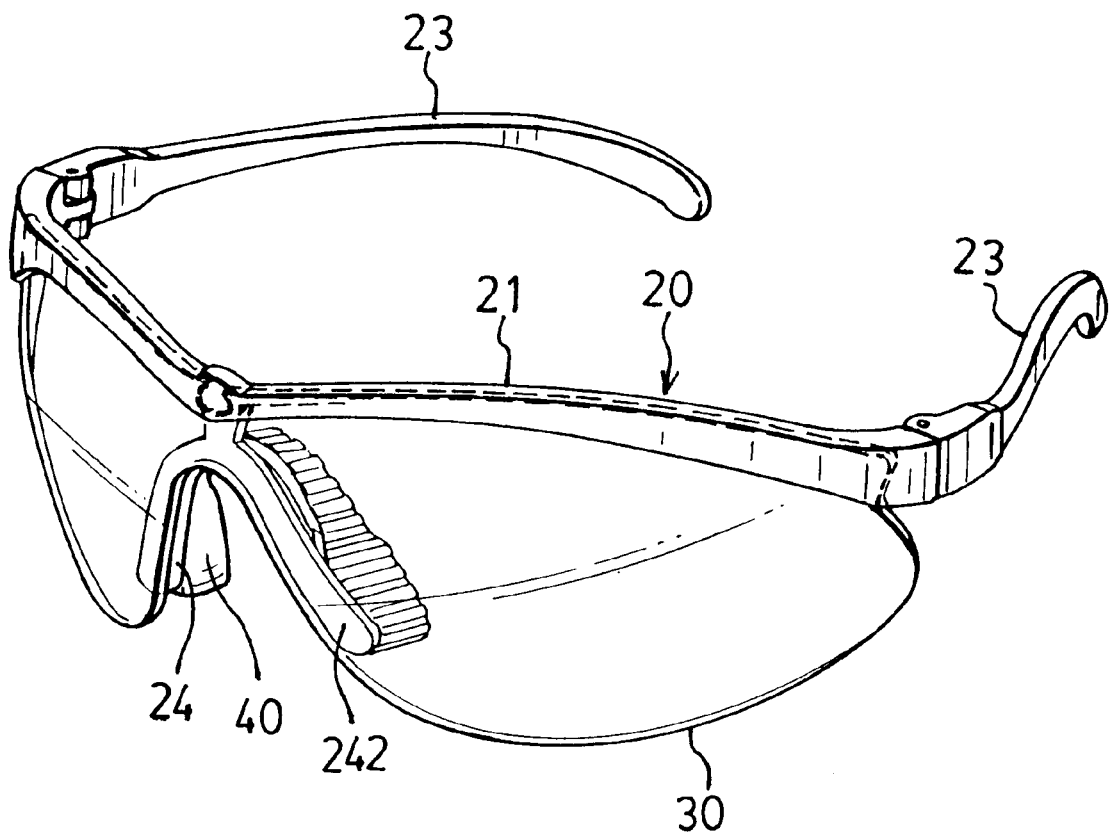
FIG. 2 is an assembled perspective view of the conventional eyeglasses.
Figure 3:
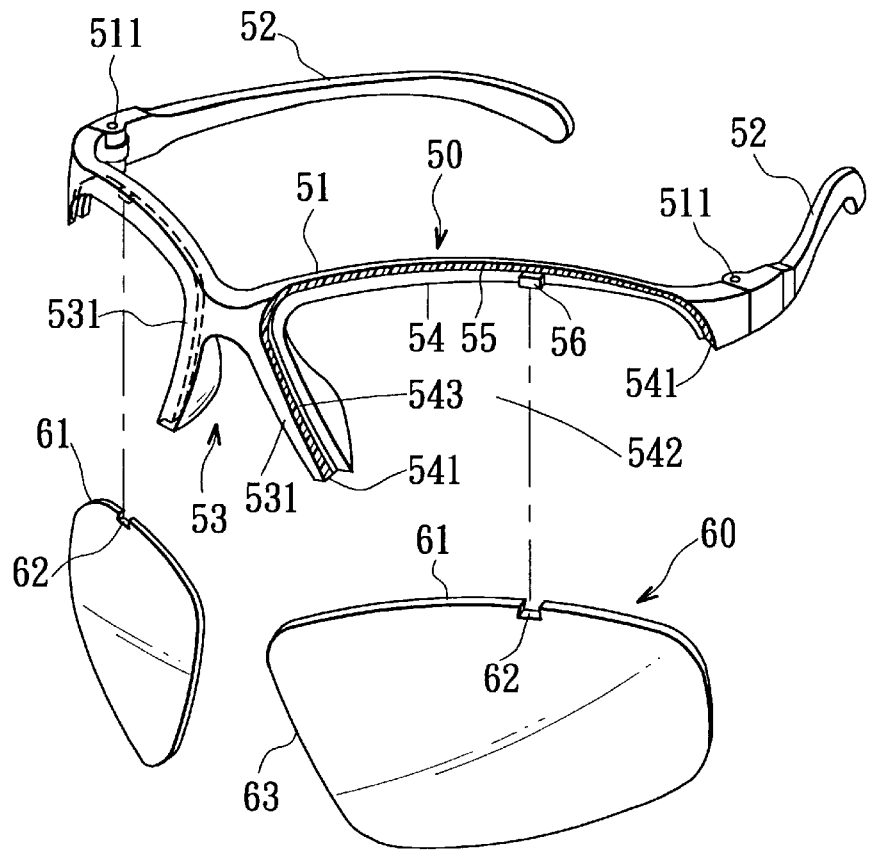
FIG. 3 is a partly exploded perspective view of the preferred embodiment of a pair of eyeglasses according to this invention.
Figure 4:
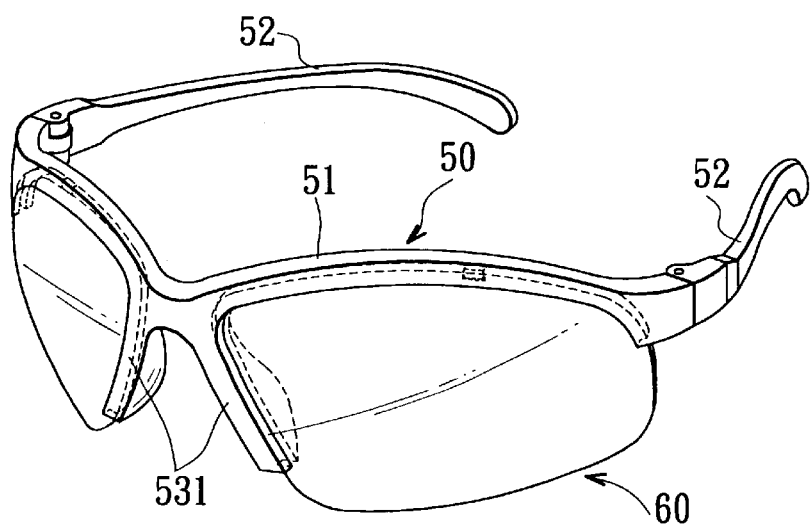
FIG. 4 is an assembled perspective view of the preferred embodiment.

Referring to FIGS. 3 and 4, the preferred embodiment of a pair of eyeglasses according to this invention is shown to include a frame unit 50 and a lens unit 60.

The frame unit 50 includes a frame 51, two temples 52 and a nose support 53. The frame 51 is unitary, and has two curved lens-engaging strips 54, each of which has an inner surface that is formed with an open-ended longitudinal slot 55. The temples 52 are mounted respectively on two ends of the frame 51 by means of bolts 511 in a known manner. The nose support 53 includes two nose-contacting portions 531. Each of the strips 54 has two ends 541 that define a gap 542 therebetween, a downwardly flaring projection 56 that protrudes integrally and downwardly from the strip 54, and a generally straight inner end portion 543, which is located near the nose support 53 and which extends in a direction that is generally parallel to a corresponding one of the nose-contacting portions 531.

The lenses 60 have upper edges 61 that engage respectively the slots 55 in the strips 54 of the frame 51. Each of the upper edges 61 has a constricted hole 62 that engages fittingly a corresponding one of the projections 56 of the frame 51.

Figure 5:
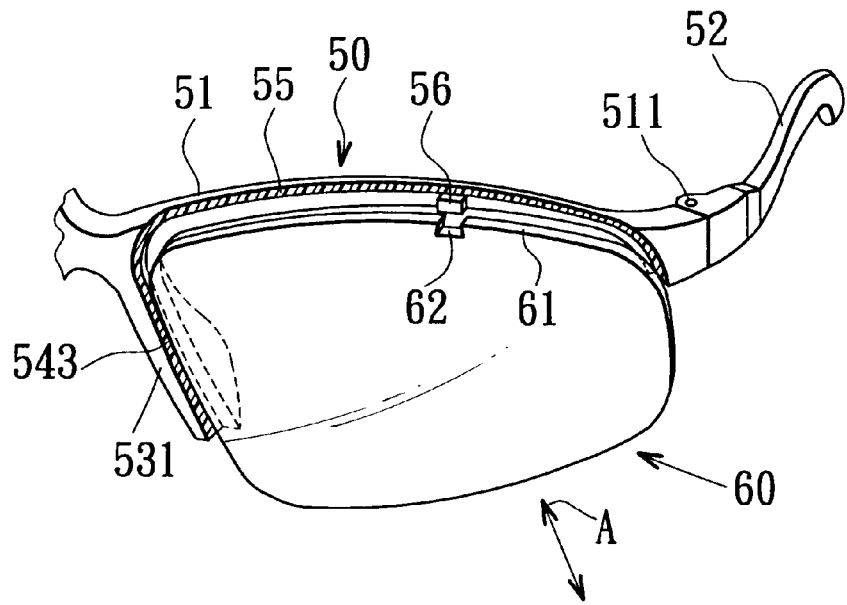
FIGS. 5 and 6 are schematic front views illustrating how a lens is snap fitted within a frame of the preferred embodiment by the engagement of a downwardly flaring projection within a constricted hole.
Figure 6:
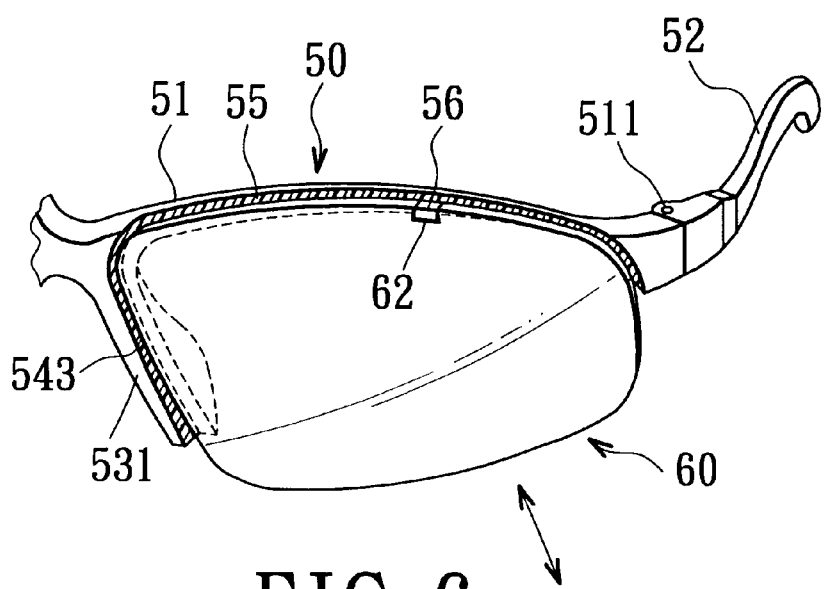

Referring to FIG. 5, in assembly, the lenses 60 are inserted into the slots 55 in the frame 51 via the gap 542 (see FIG. 3) in a direction that is indicated by an arrowhead (A) so that a generally straight inner side 63 (see FIG. 3) of each lens 60 slides along the generally straight inner end portion 543 of the corresponding strip 54, thereby aligning the hole 62 in the lens 60 with the projection 56 of the frame 51. In this way, the upper edge 61 of the lens 60 can be snap fitted easily within the slot 55 of the frame 51 by the engagement of the projection 56 within the constricted hole 62, as shown in FIG. 6. After assembly, the lens 60 can be forced away from the strip 54 via the gap 542 in the opposite direction. As such, the lens 60 can be replaced easily with one having a different color.

With this invention thus explained, it is apparent that numerous modifications and variations can be made without departing from the spirit and scope of this invention. It is therefore intended that this invention be limited only as indicated by the appended claims.

I claim:

1. A pair of eyeglasses comprising:

a frame having two curved lens-engaging strips, each of which has an inner surface that is formed with an open-ended longitudinal slot, each of said strips further having two ends that define a gap therebetween, and a downwardly flaring projection that protrudes integrally and downwardly therefrom and that is located in a corresponding one of said slots; and two lenses having upper edges that engage respectively said slots in said frame, each of said upper edges having a constricted hole that engages fittingly a corresponding one of said projections of said frame;

whereby, said lenses can be removed forcibly from said strips via said gaps.

2. A pair of eyeglasses as claimed in claim 1, wherein said frame includes a nose support that is formed integrally with said strips.

3. A pair of eyeglasses as claimed in claim 2, wherein each of said strips has a generally straight inner end portion that is located near said nose support, each of said lenses having a generally straight inner side that engages said generally straight inner end portion of a corresponding one of said strips.

* * * * *